Patented Nov. 25, 1941

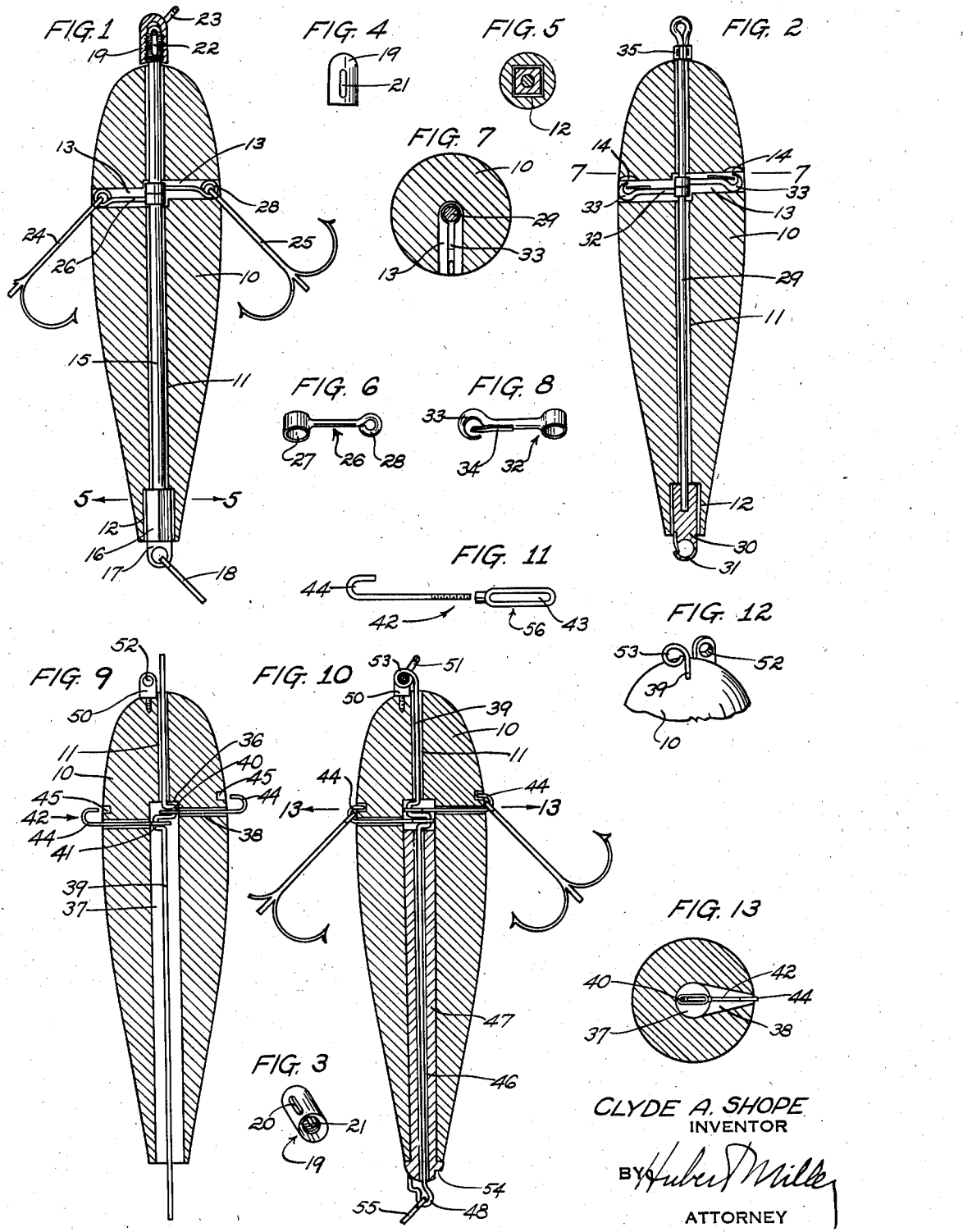

2,263,743

UNITED STATES PATENT OFFICE 2,263,743

FISHING LURE

Clyde A. Shope, Oklahoma City, Okla.

Application June 1, 1939, Serial No. 276,776

4 Claims. (Cl. 43—46)

This invention relates to an improvement in artificial fish baits of the class commonly called lures or plugs. As is well known, such lures include a body with a plurality of hooks, ordinarily 3 pronged, attached loosely thereto at various points. The lure bodies vary considerably, and the average fisherman ordinarily carries with him a number of lures, the bodies of which vary in color, size and shape. In order to carry different lures, however, it is almost necessary to have a separate box for each lure. Without a covering or enclosure of some sort the hooks stick into the clothing, or worse, into the body. On the other hand, separate boxes or enclosures are too bulky, and the plug fisherman has, therefore, been confronted with a dilemma for years.

It is the chief object of my invention to remedy this situation by providing a novel lure construction which permits the hooks to be detached from one lure body and attached to another. This allows the fisherman to carry on his person a variety of lure bodies without hooks, and to use selected ones consecutively simply by attaching and detaching a single set of hooks.

Other objects of the invention are to provide a device of this class which is so constructed that the hooks may easily be connected to and disconnected from the lure body, and which is simple in construction, yet sturdy.

The details in the construction of several preferred forms of the invention, together with other objects attending its production, will be better understood from the following detailed description when read in connection with the accompanying drawing, which is chosen for illustrative purposes only, and in which, Figure 1 is a longitudinal sectional view of a lure embodying one preferred form of the invention, hooks attached;

Figure 2 is a similar view of a lure embodying another form of the invention;

Figures 3 and 4 are respectively perspective and side views of a screw cap shown at the top of the Figure 1 embodiment in section;

Figure 5 is a lateral sectional view taken along the line 5—5 of Figure 1;

Figure 6 is a perspective view of one of the hook carrying links illustrated in Figure 1;

Figure 7 is a lateral sectional view taken along the line 7—7 of Figure 2; and

Figure 8 is a perspective view of one of the hook carrying links illustrated in Figure 2;

Figures 9 and 10 are longitudinal sectional views of a lure embodying another form of the invention, and show details of construction;

Figure 11 is a perspective view of one of the links used in the Figure 9 embodiment;

Figure 12 is a perspective view of the forward end of the lure illustrated in Figures 9 and 10;

Figure 13 is a sectional view taken along the line 13—13 of Figure 10.

Like characters of reference designate like parts in all the figures.

All embodiments include a body of any suitable shape, designated as a whole by the numeral 10, provided with a longitudinal central bore 11 which extends throughout the length of the body, and which in the Figure 1 and Figure 2 embodiments is abruptly enlarged at the rear end of the body to form a seat 12, which is of any irregular cross sectional shape (see Fig. 5). In the embodiment illustrated in Figures 9 to 13, this bore 11 is enlarged from the point 36 to the extreme rear end of the body, and this enlarged bore 37 may be of any cross sectional shape, either circular as shown, or irregular.

Intermediate its ends, at any desired point or points, the body is provided with one or more radially extending passageways 13 which communicate with the longitudinal central bore 11. These passageways 13 in the Figure 2 embodiment are slightly enlarged at one point, 14, for a reason which will be hereinafter explained. In the Figure 9 embodiment, these passageways are designated by the numeral 38, and are of considerably greater cross sectional area at their inner ends than at their outer ends, as shown in Figure 13.

Referring now to the embodiment illustrated in Figure 1, I provide a rod 15, one end of which is enlarged, as at 16, and is complementally shaped to fit into the seat 12 to prevent rotation of the rod within the body 10. The extreme end of the enlarged portion 16 is in the form of an eyelet 17 which serves as a connection for a rear hook 18. The length of the rod 15 is such that when the portion 16 is seated in its seat 12, the opposite end of the rod protrudes from the forward end of the lure body 10 a short distance. The protruding rod end is threaded to receive a cap 19 which serves to firmly but removably secure the rod 15 within the body. To lock the cap on the rod end, the cap is provided with a pair of longitudinally extending diametrically opposite slots 20 and 21, as illustrated in Figures 3 and 4. The protruding end of the rod 15 is provided with a similarly shaped slot 22, the slots in the cap being longer than the slot in the rod to permit a tightening adjustment of the cap. In preparing the lure for use, the cap 19 is screwed down firmly against the end of the body 15, the slots in the cap and in the rod are aligned, and a suitably constructed line attaching member 23 is passed through the slots in both rod and cap.

As a means of mounting the hooks 24 and 25, which are ordinarily arranged one on each side of the lure body, I provide a pair of connector links 26, a preferred form of which is clearly illustrated in Figure 6. Formed at one end of each link 26 is an eyelet 27, the perforation in which is of a diameter to receive the rod 15. Another eyelet 28 is formed at the opposite end of each link 26, and lies in a plane substantially at right angles to that in which the eyelet 27 lies. These eyelets 28 serve as a connecting means for the shank ends of the hooks 24 and 25, the loose connection permitting the hooks a wide range of movement with relation to the lure body.

With the assembly illustrated in Figure 1, to change the hooks from one lure body to another, it is only necessary to remove the line attaching member 23 from the forward end of the lure, unscrew the cap 19 from the rod 15, remove the rod from the body, which releases the links 26, and then reassemble the rod and hooks in reverse order on another similarly constructed lure body.

Referring now more particularly to the embodiment of the invention illustrated in Figures 2, 7 and 8, I provide a flexible cable 29 in place of the rod 15. One end of the cable is firmly attached in any suitable manner to a hook connector 30 which is similar to the enlarged portion 16 of the rod 15 of the other embodiment. The connector 30 is also of such cross sectional shape as to complementally fit the seat 12, and the extreme outer end of the connector is provided with a snap fastener 31, which serves to detachably secure the hook 18 to the lure.

In this embodiment connector links 32 are used for detachably securing the hooks 24 and 25 to the lure body. The inner ends of these links 32 may be identical to the eyelets 27 of the links 26, but their opposite ends are in the form of small hooks 33, fitted respectively with lock springs 34. The enlarged portions 14 of the passageways 13 are located near the ends of the hooks 33, and serve to permit the shank ends of the hooks 24 and 25 to be disengaged and removed from the hooks 33 while the links remain in position in their respective passageways. The cable 29 is held firmly in the lure body by a tiny cable clamp 35 which is clamped over the looped forward end of the cable 29, the loop serving as a means of fastening the lure to a fishing line.

In this embodiment it is contemplated that each lure body will be fitted with a cable 29 and a hook connector 30, with the cable looped and clamped at the forward end of the lure body, as shown. To change the hooks 18, 24 and 25 from one lure body to another, it is only necessary to disengage them from their respective hooks 31 and 33 in one body, and to fasten them into the similar hooks of another body. In case it is desired to refinish the lure body with shellac or varnish however, the cable 29, and hook connectors 30 and 32 may be removed simply by removing the cable clamp 35 and slipping the cable out the rear end of the body.

Referring now more particularly to the embodiment shown in Figures 9 to 13 inclusive, I provide a rod 39 in the form of a crank shaft, its two crank arms 40 and 41 being disposed at opposite sides of the longitudinal axis of the rod. The passages 38 are in alignment with the crank arms 40 and 41, and are of such shape as to afford reciprocal movement for identical links 42, the inner ends of which are journaled on the crank arms 40 and 41 respectively. The links 42 include slotted sleeves 56, the slots 43 of which are of a size to permit the offset crank arms to pass the therethrough, for assembly. The outer ends of the links 42 are in the form of hooks 44, the free ends of which are adapted to seat in laterally disposed oppositely positioned passages 45 as the rod 39 is rotated in a direction to pull the links 42 toward the center of the body 10. In this embodiment it will be seen that the bore hole 11 as well as the aligned bore hole 46 in the insert plug 47 serve as journals for the rod 39. The opposite ends of the rod 39 are straight when the rod is inserted into the body 10 from its rear end. After the crank arms 40 and 41 are respectively positioned within the slots 43 of the links 42, the threaded shanks of the hooks 44 are screwed into the position shown in Figure 13, to form one side of the crank arms journal. The cylindrical insert plug 47 with the longitudinal central bore hole 46 is then inserted into the large bore hole 37 from the rear of the plug 47 and is rigidly secured therein by means of water proof glue, or by pins (not shown) which may be driven through the body 10 and into said insert plug. After the plug 47 has been rigidly secured in position in the lure body 10, the protruding rear end of the rod 39 is bent to form a hook 48, the free end of which is so spaced from the rotational axis of the rod 39 as to contact and scrape the rounded rear end of the lure body as the rod is rotated. A notch 54 is cut into the rear end of the lure body, as shown in Figure 10, so that when the rod 39 is rotated to such a position that the free end of the hook 48 is opposite the notch 54, there is sufficient clearance between the free end of the hook and the adjacent portion of the lure body to permit the eyelet of a fish hook 55 to pass between the two. After the eyelet end of the fish hook 55 has been moved to the position shown in Figure 10 the rod 39 is rotated a half turn which places the end of the hook 48 against the end of the lure body, and thus prevents the fish hook 55 from being removed accidentally from the hook 48.

A lug body 50 is rigidly positioned at the forward end of the lure body immediately adjacent the rod 39. This lug is provided with a perforation 52 for co-operating with an eyelet 53, into which the protruding forward end of the rod 39 is formed after the rod has been properly positioned in the lure body. This eyelet 53 preferably lies in a plane which passes through the axis of said rod and through the crank arms 40 and 41. When the rod is rotated to the position shown in Figure 10, the eyelet 53 is moved to a position immediately adjacent the lug 50, the holes in the lug and in the eyelet being aligned. A small snap ring 51 may be passed through the aligned perforations and serves to lock the rod 39 against rotation. With the rod in this position it will be seen that the ends of the hooks 44 are seated in their respective pockets 45, and that the fish hooks carried by the hooks 44 cannot become detached therefrom. Also the fish hook carried by the hook 48 is similarly secured against accidental detachment therefrom.

When it is desired to remove all the fish hooks from the lure, the snap ring 51 is removed, the rod 39 is rotated a half turn into the position shown in Figure 9 which movement simultaneously causes the ends of the hooks 44 to move out of their seats 45, and causes the end of the hook 48 to asume a position adjacent the notch 54. The fish hooks may then be freely removed from the hooks 44 and 48, to be similarly attached to another body similarly constructed.

While I have described and illustrated three embodiments of the invention, I am aware that numerous alterations and changes may be made in the details of construction, and I do not wish to be limited except by the prior art and by the scope of the appended claims.

I claim:

1. A lure of the class described comprising: an elongated body part having a longitudinal central passage and a plurality of radially extending passages communicating therewith; a fish-hook carrying link in each of said radially extending passages; means on the outer ends of said links for positively but removably securing fishhooks thereto; an elongated member in said central passage threaded through the inner ends of said links; and means for positively but removably securing said elongated member against longitudinal and rotative movement in said central passage.

2. A lure of the class described comprising: an elongated body part having a longitudinal central passage and a plurality of radially extending passages communicating therewith; a fishhook carrying link in each of said radially extending passages; means on the outer ends of said links for positively but removably securing fishhooks thereto; an elongated member in said central passage threaded through the inner ends of said links; and combination means for positively but removably securing said elongated member against longitudinal and rotative movement in said central bore and for attaching the forward end of the lure to a fishing line.

3. A lure of the class described comprising: an elongated body part having a longitudinal central passage and a plurality of radially extending passages communicating therewith; a fishhook carrying link in each of said radially extending passages; means on the outer ends of said links for positively but removably securing fishhooks thereto; an elongated member in said central passage threaded through the inner ends of said links: combination means for positively but removably securing said elongated member against movement in said central bore and for attaching the forward end of the lure to a fishing line; and means at the rear end of said elongated member for attaching a fish hook thereto.

4. A lure of the class described comprising: an elongated body having a central longitudinal passage and a plurality of spaced radially extending passages communicating therewith; a hook carrying link in each of said radially extending passages, the inner end of each link being in the form of an eyelet and extending into said central passage; an elongated crank rod in said central passage, each of its crank arms being positioned within the eyelet end of one of said links so that as the rod is rotated the links are reciprocated in their respective passages; and means for securing said crank rod against longitudinal or rotational movement within the body.

CLYDE A. SHOPE.